(12) United States Patent
Maxfield et al.

(10) Patent No.: US 12,087,170 B2
(45) Date of Patent: Sep. 10, 2024

(54) METHODS AND SYSTEMS FOR DISPLAYING SIMPLIFIED PRIMARY FLIGHT INFORMATION FOR AN URBAN AIR MOBILITY VEHICLE (UAMV)

(71) Applicant: HONEYWELL INTERNATIONAL INC., Charlotte, NC (US)

(72) Inventors: Jacob Kirk Maxfield, Albuquerque, NM (US); Christopher Haraway, Peoria, AZ (US); Dean Wilkens, Scottsdale, AZ (US); Roberto Gudino, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 45 days.

(21) Appl. No.: 17/499,228

(22) Filed: Oct. 12, 2021

(65) Prior Publication Data

US 2022/0122471 A1     Apr. 21, 2022

Related U.S. Application Data

(60) Provisional application No. 63/092,986, filed on Oct. 16, 2020.

(51) Int. Cl.
| | |
|---|---|
| *G08G 1/123* | (2006.01) |
| *B64D 43/02* | (2006.01) |
| *G01C 21/00* | (2006.01) |
| *G01C 23/00* | (2006.01) |
| *G05G 5/02* | (2006.01) |
| *G08G 5/00* | (2006.01) |

(52) U.S. Cl.
CPC ........... *G08G 5/0021* (2013.01); *B64D 43/02* (2013.01); *G01C 23/005* (2013.01); *G08G 5/003* (2013.01); *G08G 5/0047* (2013.01)

(58) Field of Classification Search
None
See application file for complete search history.

(56) References Cited

U.S. PATENT DOCUMENTS

| | | | |
|---|---|---|---|
| 5,420,582 A | 5/1995 | Kubbat et al. | |
| 10,514,707 B1* | 12/2019 | Carrico | B64D 45/00 |
| 2005/0206533 A1* | 9/2005 | Rogers | G01C 23/00 |
| | | | 340/972 |
| 2006/0164262 A1* | 7/2006 | Wyatt | G01C 23/00 |
| | | | 340/973 |
| 2008/0262664 A1 | 10/2008 | Schnell et al. | |
| 2010/0030405 A1* | 2/2010 | He | G01C 23/00 |
| | | | 701/14 |
| 2010/0052949 A1* | 3/2010 | Suddreth | G01C 23/00 |
| | | | 340/995.19 |
| 2013/0060466 A1* | 3/2013 | Gurusamy | G01C 23/005 |
| | | | 701/465 |
| 2014/0353356 A1* | 12/2014 | Kabluyen | A61B 17/068 |
| | | | 227/176.1 |

(Continued)

*Primary Examiner* — Adam D Tissot
*Assistant Examiner* — Michael T Silva
(74) *Attorney, Agent, or Firm* — Lorenz & Kopf LLP

(57) ABSTRACT

Flight display systems and methods for displaying simplified primary flight information for an urban air mobility vehicle (UAMV). Embodiments provide a primary flight display with an enhanced human-machine interface to support the intuitive operation of the UAMV commensurate with an expected reduced training background of the operators.

20 Claims, 11 Drawing Sheets

(56) References Cited

U.S. PATENT DOCUMENTS

2014/0354456 A1\* 12/2014 Gannon ............... G08G 5/0021
340/972
2019/0096270 A1\* 3/2019 Wang ................... G08G 5/0047

\* cited by examiner

METHODS AND SYSTEMS FOR DISPLAYING SIMPLIFIED PRIMARY FLIGHT INFORMATION FOR AN URBAN AIR MOBILITY VEHICLE (UAMV)

CROSS REFERENCE TO RELATED APPLICATION

The present application claims benefit of prior filed U.S. Provisional Patent Application No. 63/092,986, filed Oct. 16, 2020, which is hereby incorporated by reference herein in its entirety.

TECHNICAL FIELD

The following disclosure relates generally to urban air mobility vehicles (UAMVs), and, specifically, to methods and systems for displaying simplified primary flight information for an urban air mobility vehicle (UAMV).

BACKGROUND

The emerging market of UAM (Urban Air Mobility) includes UAMV (UAM vehicles) such as e-VTOL (electric Vertical Take-off and Landing) vehicles. The context, or use-cases, for operation of a UAMV is different from that of operation of a traditional aircraft or helicopter in a variety of significant ways. Additionally, it is intended that operators/pilots of UAMVs will require significantly less training than operators of traditional aircraft and helicopters. Therefore, companies are developing UAMVs to operate differently than traditional aircraft or helicopters; the UAMV-specific operations are sometimes referred to as simplified vehicle operations (SVO). A technical problem is presented in that, regardless of the differences in operation and training, operators/pilots of UAMVs must be able to intake, process, and react to necessary operational feedback from the UAMV.

Accordingly, provided embodiments of flight display systems and methods include technological solutions that emphasize human factors data and improve the human-machine interface (HMI), where interactions between an operator and various systems occur. Embodiments provide a technological solution including a primary flight display with an enhanced human-machine interface to support the intuitive operation of the UAMV and the reduced training background of the operators. Furthermore, other desirable features and characteristics of the present invention will be apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a system for displaying primary flight information for an urban air mobility vehicle (UAMV), including: a source of geospatial data for the UAMV; a display system configured to process the geospatial data and map data for displaying on a display device onboard the UAMV; a controller operationally coupled to the source of geospatial data and the display system, the controller programmed to: display a virtual camera view including an active leg and a zero pitch reference line; render a flight path vector symbol on the zero pitch reference line, the flight path vector symbol being a projection of a current track of the UAMV on the zero pitch reference line; and depict a current lateral and vertical orientation as well as the current track angle and flight path angle of the UAMV by rendering a right rail and a left rail within the virtual camera view.

Also provided is a method for displaying primary flight information for an urban air mobility vehicle (UAMV), including: a controller operationally coupled to a source of geospatial data and a display system, displaying a virtual camera view including an active leg and a zero pitch reference line; rendering a flight path vector symbol on the zero pitch reference line, the flight path vector symbol being a projection of a current heading of the UAMV on the zero pitch reference line; and depicting a current lateral and vertical orientation of the UAMV by rendering a right rail and a left rail on the virtual camera view.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. As further appearing herein, the term "pilot" encompasses all users of the below-described aircraft system.

As mentioned, the context, or use-cases, for operation of an urban air mobility vehicle (UAMV) is different from that of operation of a traditional aircraft or helicopter in a variety of significant ways. Responsive thereto, companies are developing UAMVs to operate differently than traditional aircraft or helicopters; the UAMV-specific operations are sometimes referred to as simplified vehicle operations (SVO). Additionally, it is intended that operators/pilots of UAMVs will require significantly less training than operators of traditional aircraft and helicopters. A technical problem is presented in that, regardless of the differences in operation and training, operators/pilots of UAMVs must be able to intake, process, and react to necessary operational feedback from the UAMV.

The present disclosure provides embodiments of flight display systems with an enhanced human-machine interface (HMI) for the operator to use to interact with UAMV operations. The enhanced human-machine interface considers human factors, providing a more simple and intuitive display with which the operator may observe, process, and react, to necessary operational feedback from the UAMV. Embodiments provide a technological solution including a flight display with the enhanced human-machine interface to support the intuitive operation of the UAMV and the reduced training background of the operators.

Figure 1:
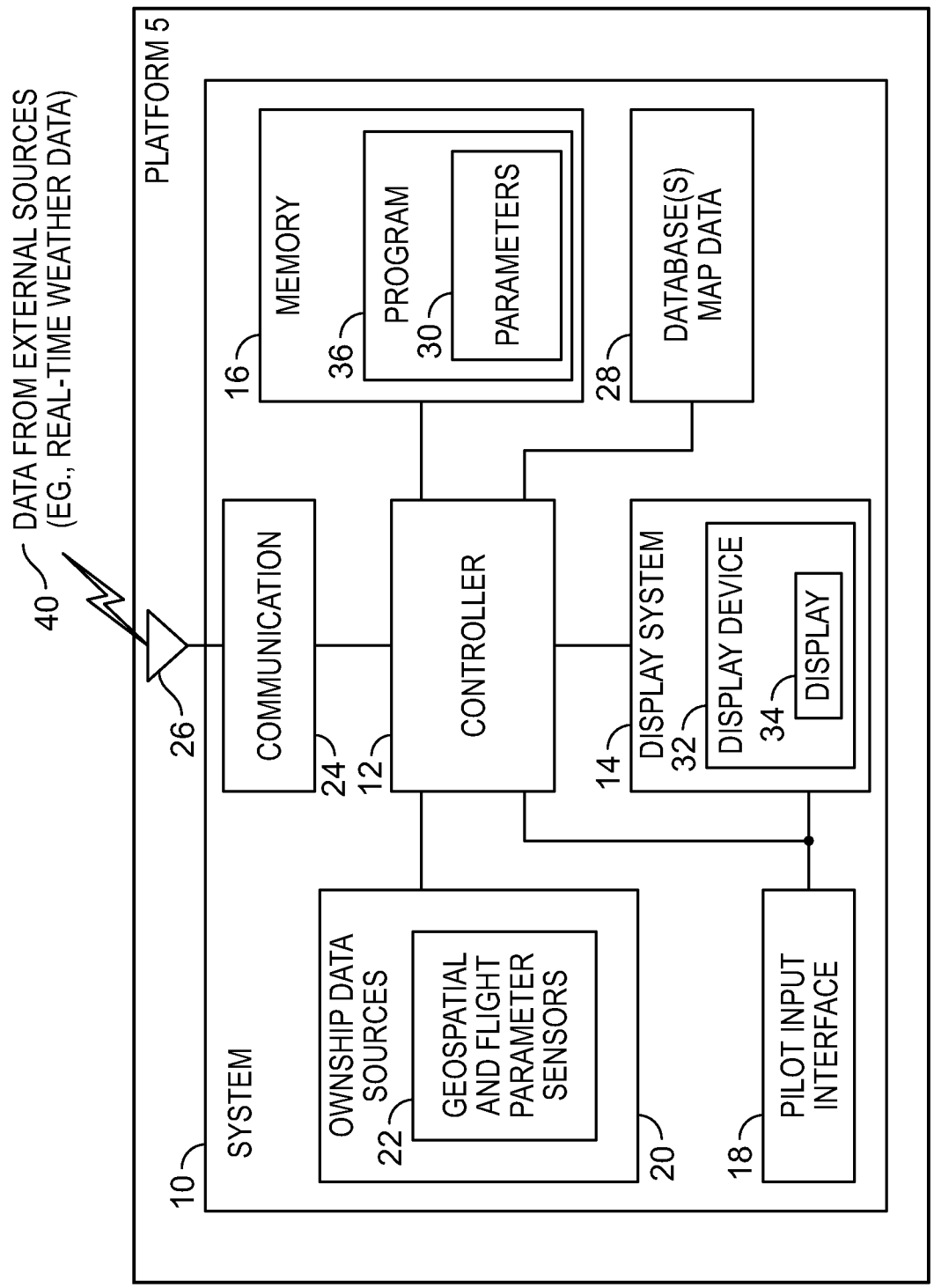
FIG. 1 is a block diagram of a system for displaying simplified primary flight information for an urban air mobility vehicle (UAMV), as illustrated in accordance with an exemplary embodiment of the present disclosure.

FIG. 1 is a block diagram of system for displaying simplified primary flight information for an urban air mobility vehicle (UAMV) 10, as illustrated in accordance with an exemplary and non-limiting embodiment of the present disclosure. The system for displaying simplified primary flight information for an urban air mobility vehicle (UAMV) 10 may be utilized onboard a mobile platform to provide enhanced terrain awareness, as described herein. In various embodiments, the mobile platform is urban air mobility vehicle 5, which carries or is equipped with the system for displaying simplified primary flight information for an urban air mobility vehicle (UAMV) 10. As schematically depicted in FIG. 1, the system for displaying simplified primary flight information for an urban air mobility vehicle (UAMV) 10 (shortened herein to "system" 10) includes the following components or subsystems, each of which may assume the form of a single device or multiple interconnected devices: a controller 12 operationally coupled to: at least one display device 32, which may optionally be part of a larger on-board display system 14; computer-readable storage media or memory 16; a pilot input interface 18, and ownship data sources 20 including, for example, an array of flight system status and geospatial sensors 22. The system 10 may be separate from or integrated within: a flight management system (FMS) and/or a flight control system (FCS). The system 10 may also contain a datalink subsystem 24 including an antenna 26, which may wirelessly transmit data to and receive data (40) from various sources external to system 10, such as a cloud-based weather (WX) forecasting service.

Although schematically illustrated in FIG. 1 as a single unit, the individual elements and components of the system 10 can be implemented in a distributed manner utilizing any practical number of physically distinct and operatively interconnected pieces of hardware or equipment. When the system 10 is utilized as described herein, the various components of the system 10 will typically all be located onboard the UAMV 5.

The term "controller," as appearing herein, broadly encompasses those components utilized to carry-out or otherwise support the processing functionalities of the system 10. Accordingly, controller 12 can encompass or may be associated with one or more individual processors, flight control computers, navigational equipment pieces, computer-readable memories (including or in addition to memory 16), power supplies, storage devices, interface cards, and other standardized components. In various embodiments, controller 12 includes or cooperates with at least one firmware and software program (generally, computer-readable instructions that embody an algorithm) for carrying-out the various process tasks, calculations, and control/display functions described herein. During operation, embodiments of the controller 12 may include a computer processor programmed with (i.e., enhanced with) and executing the at least one firmware or software program, for example, program 36, that embodies an algorithm for displaying simplified primary flight information for an UAMV, to thereby perform the various process steps, tasks, calculations, and control/display functions described herein. In other embodiments, the controller 12 may be implemented as a programmable logic array, or as one or more software modules in the form of a program product.

Controller 12 may exchange data 40 with one or more external sources to support operation of the system 10 in embodiments. In this case, bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

Memory 16 can encompass any number and type of storage media suitable for storing computer-readable code or instructions, such as the aforementioned software program 36, as well as other data generally supporting the operation of the system 10. Memory 16 may also store one or more parameters and threshold values, generically represented by parameters 30, for use by an algorithm embodied in software program 36.

A source of three-dimensional map data comprising streets and objects is part of system 10. In certain embodiments, the source is one or more databases 28 employed to receive and store current high-definition map data including geographical (terrain), buildings, bridges, and other structures, street maps, and navigational databases, which may be updated on a periodic or iterative basis to ensure data timeliness. In various embodiments, UAMV-specific parameters, such as a maximum ground speed and maximum vertical acceleration and deceleration, may be stored in the memory 16 or in the one or more databases 28, and referenced by the program 36. In various embodiments, these databases may be available online.

Flight parameter sensors and geospatial sensors 22 supply various types of data or measurements to controller 12 during UAMV flight. In various embodiments, the geospatial sensors 22 supply, without limitation, one or more of: remaining battery time, inertial reference system measurements providing a location, Flight Path Angle (FPA) measurements, airspeed data, groundspeed data, vertical speed data, vertical acceleration data, altitude data, attitude data including pitch data and roll measurements, yaw data, data related to UAMV weight, time/date information, heading information, data related to atmospheric conditions, flight path data, flight track data, radar altitude data, geometric altitude data, wind speed and direction data. Further, in certain embodiments of system 10, controller 12 and the other components of the system 10 may be included within or cooperate with any number and type of systems commonly deployed onboard UAMV including, for example, an FMS, an Attitude Heading Reference System (AHRS), an Instrument Landing System (ILS), and/or an Inertial Reference System (IRS), to list but a few examples.

With continued reference to FIG. 1, display device 32 can include any number and type of image generating devices on which one or more avionic displays may be produced. When the system 10 is utilized for a manned UAMV, display device 32 may be affixed to the static structure of the UAMV cockpit as, for example, a Head Down Display (HDD) or Head Up Display (HUD) unit. Alternatively, display device 32 may assume the form of a movable display device (e.g., a pilot-worn display device) or a portable display device, such as an Electronic Flight Bag (EFB), a laptop, or a tablet computer carried into the UAMV cockpit by a pilot.

At least one avionic display 34 is generated on display device 32 during operation of the system 10; the term "avionic display" defined as synonymous with the term "aircraft-related display" and "cockpit display" and encompasses displays generated in textual, graphical, cartographical, and other formats. The system 10 can generate various types of lateral and vertical avionic displays 34 on which symbology, text annunciations, and other graphics pertaining to flight planning are presented for a pilot to view. The display device 32 is configured to continuously render at least a lateral display 34 showing the UAMV at the current location within the map data. The avionic display 34 generated and controlled by the system 10 can include alphanumerical input displays of the type commonly presented on the screens of MCDUs, as well as Control Display Units (CDUs) generally. Specifically, embodiments of avionic displays 34 include one or more two-dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

In various embodiments, an enhanced human-machine interface (HMI) (as described herein) is implemented as an integration of the pilot input interface 18 and a display device 32. Via various display and graphics systems processes, the controller 12 may command and control the touch screen display generating a variety of graphical user interface (GUI) objects or elements, for example, buttons, sliders, and the like, which are used to prompt a user/operator to interact with the human-machine interface to provide user/operator input, and to activate respective functions and provide user feedback, responsive to received user input at the GUI element.

Figure 2:
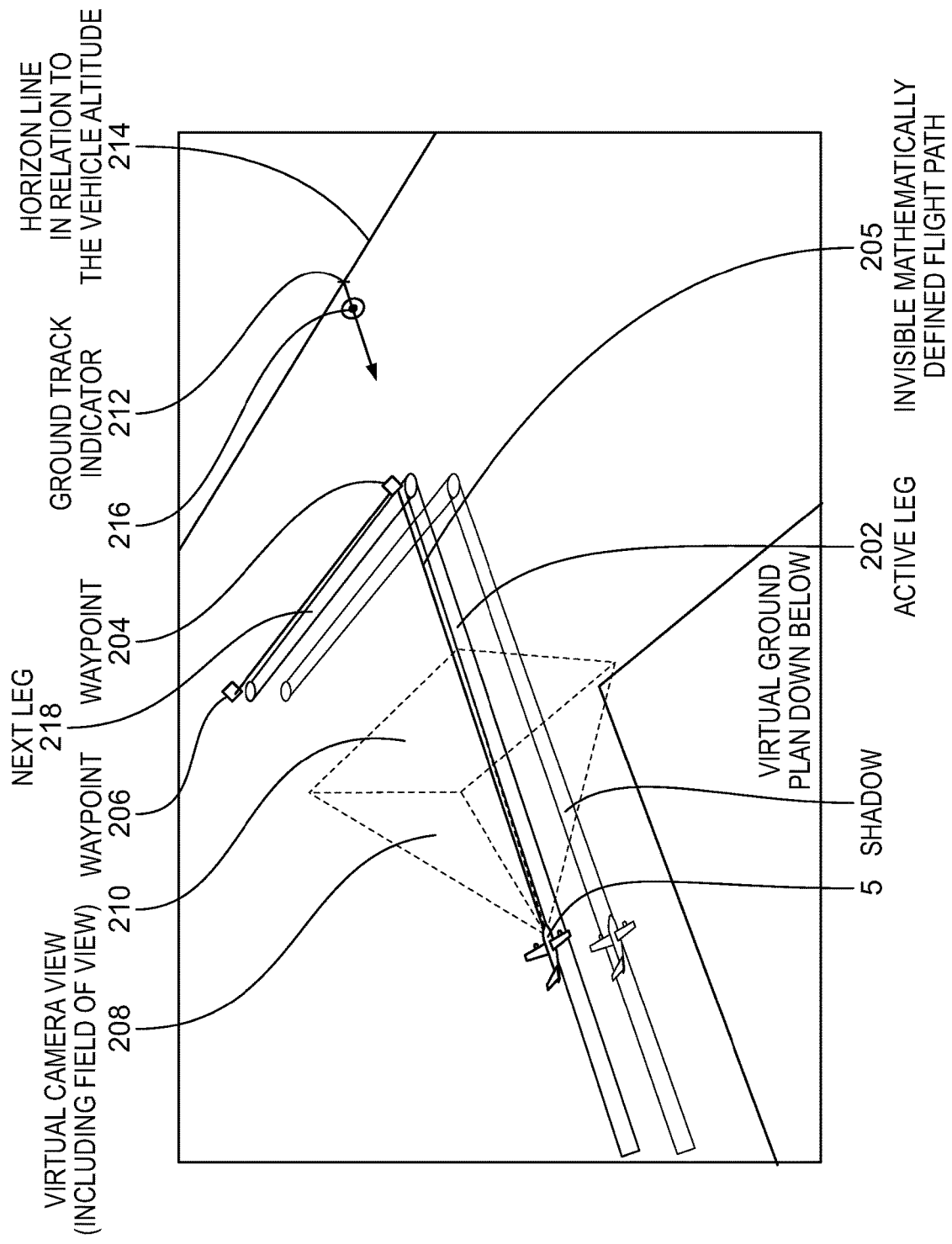
FIG. 2 is an image providing a framework or mental model for various embodiments of the enhanced human-machine interface of the system 10 shown in subsequent figures.

FIG. 2 provides a framework or mental model for various embodiments of the enhanced HMI of the system 10 shown in subsequent figures. UAMV 5 is shown on an intended path, active leg 202, of a flight path 205. Flight path 205 is a mathematically defined intended travel path and includes intended waypoint 204 and waypoint 206.

The herein described system 10 operations may be ascribed to the programming of the controller 12, in particular, to an enhanced computer processor programmed to perform the herein described tasks as method steps. In practice, portions of a method for displaying primary flight information for an urban air mobility vehicle (UAMV) may be performed by different components of the described system 10. It should be appreciated that a method for displaying primary flight information for an urban air mobility vehicle (UAMV) may be incorporated into a more comprehensive procedure or method having additional functionality not described in detail herein.

In a method step, the controller constructs a visualization of the flight path 205 that includes segments or legs, such as active leg 202 and next leg 218. Active leg 202 represents an intended location/orientation of the flight path 205 between the last waypoint (or current location of the UAMV 5) and waypoint 204. A next leg 218 depicts a next intended location/orientation the flight path 205 for the UAMV 5 after waypoint 204. In another step, the controller 12 extends an instantaneous ground track heading of the UAMV 5 axially forward to thereby demark a flight path vector symbol 212 on a zero pitch reference line 214. The flight path vector symbol 212 may be a combination of a ground track indicator and a flight path angle indicator. The controller may encircle the flight path vector symbol 212 with a symbolic icon, such as a bullseye 216, to visually communicate the projection of the instantaneous ground track (horizontally), combined with flight path angle (vertical) component and/or the track rate and flight path angle rate of the UAMV 5. Additionally, the controller may determine and render a combined "track angle rate" or "turn rate" and "flight path angle rate" symbol.

In a step, the controller 12 constructs and displays a virtual camera view 208 (the display 34), the virtual camera view 208 representing a field of view of the operator and may place terrain and objects on a plane 210 that is perpendicular to a heading of the UAMV 5. The plane 210 of the virtual camera view 208 introduces the images in FIGS. 3-11.

Figure 3:
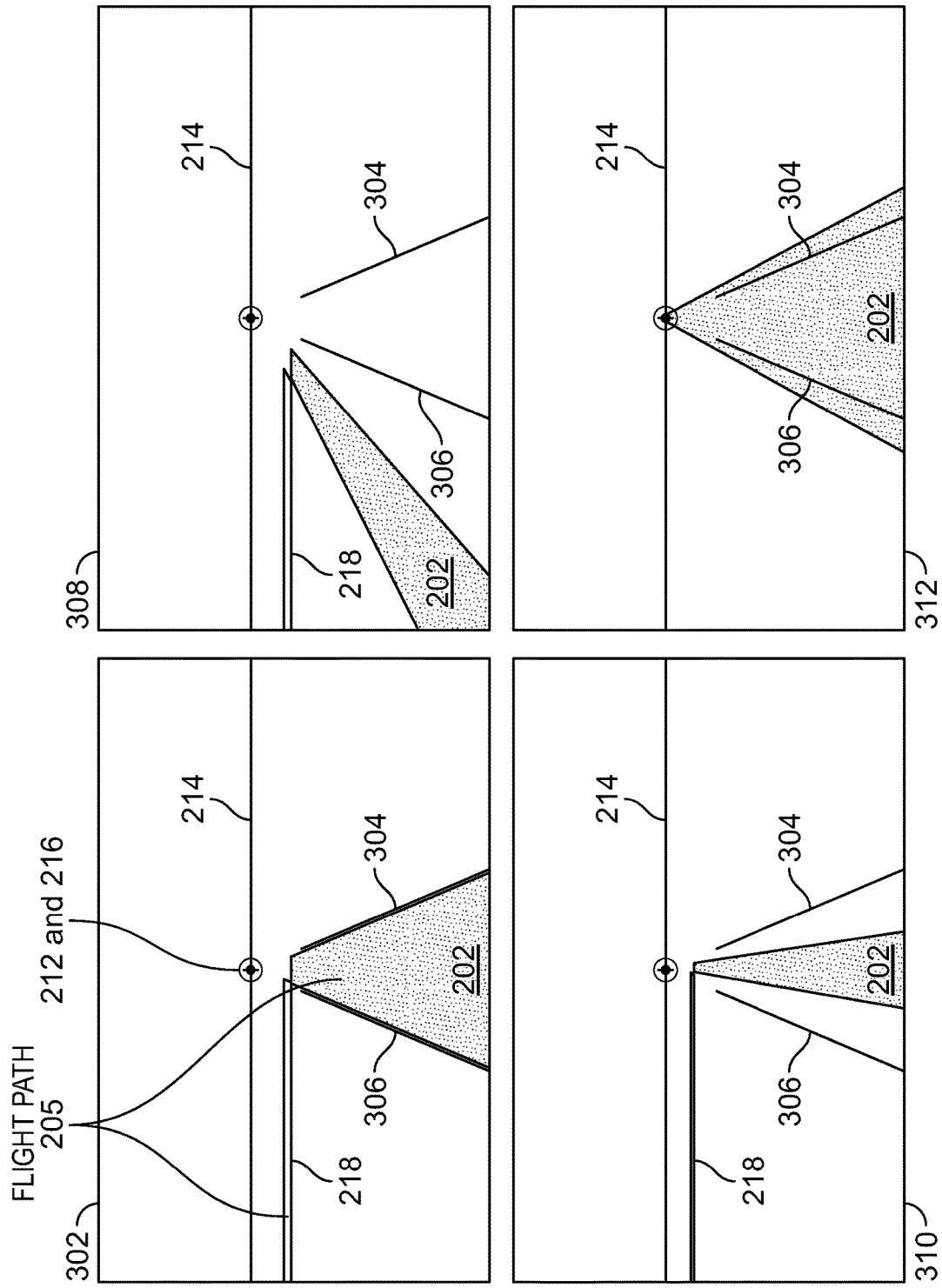
FIGS. 3-11 are a series of images to illustrate various displayed images as may be generated and displayed on the display device of a UAMV, in accordance with an exemplary embodiment of the present disclosure.

In FIG. 3, the system 10 or method displays virtual camera views 208 (for example, images 302, 308, 310, and 312) that each show the active leg 202, the zero pitch reference line 214, and the flight path vector symbol 212. In various embodiments, the controller 12 performs a step of overlaying a bullseye 216 on the flight path vector symbol 212. In various embodiments, the controller 12 will also render the next leg 218.

In various embodiments, the controller 12 performs a step of modifying the appearance of the active leg 202 to visually convey depth or distance. The controller 12 may modify the active leg 202 to be wider at the bottom of the display (virtual camera view), indicating a closeness (in space) to a current location of the operator/UAMV 5, and thinner as it approaches mid-display (i.e., a middle of the virtual camera view) to indicate a distance from the current location of the UAMV 5. In various embodiments, the mid-display may represent a target or next waypoint. This rendering of the active leg (wider/closer and narrower/farther) depicts distance or depth, as an intuitive human factor, providing an objectively improved HMI.

In another step, the controller 12 may visually distinguish the active leg 202 and the next leg 218 from each other. In various embodiments, the active leg 202 is rendered using a first visualization technique and the next leg 218 is rendered using a second visualization technique. In some embodiments, the first visualization technique is a first color, and the second visualization technique is a second color, different from the first; in some embodiments, the first visualization technique is a first shade or hatch pattern, and the second visualization technique is a second shade or hatch pattern, different from the first.

Embodiments further enhance the HMI reflective of additional human factors. Embodiments depict an operational status with respect to the intended flight path 205 using graphical renderings that reflect human factors. As used herein, operational status includes a lateral and vertical adherence to the intended flight path 205, and in particular, to the active leg 202. In various embodiments, in a step, the controller 12 depicts a current lateral and vertical orientation of the UAMV 5 by rendering a right rail 304 and a left rail 306 on the virtual camera view on the display. The combination of these symbols provides, using the HMI, a simplified and intuitive communication of an operational status of the UAMV 5 to the operator, described as follows.

In displayed image 302, the overlay of the bullseye 216 on the flight path vector symbol 212, and the left rail 306 and right rail 304 straddling the rendering of the intended path or active leg 202, intuitively indicates an operational status of "on the right track," showing that a current lateral and vertical orientation of the UAMV 5 is lined up with the active leg 202, and therefore the UAMV 5 is where it should be.

In displayed image 308, the overlay of the bullseye 216 on the flight path vector symbol 212 means the UAMV 5 will maintain altitude and ground track. The shape of the active leg 202, and its position relative to the rails in image 308, provide information about performance to the desired location (laterally and vertically), desired track angle, and the desired flight path angle. In 308, the overlay of the bullseye 216 on the flight path vector symbol 212 conveys the track and flight path angle being lined up with the flight path vanishing point (i.e., lining up to the desired track angle and flight path angle), but both the left rail 306 and the right rail 304 are to the right of the active leg 202, which intuitively indicates that a current lateral location is deviated from course and vertical orientation of the UAMV 5 is approximately aligned with the vertical path, specifically, it is to the right of the intended path or flying parallel to the active leg 202. When a waypoint element (FIG. 9, 910) is added, the displayed image explicitly shows you are at the desired altitude.

As mentioned, the shape of the active leg (including its perceived vanishing point) 202, and its position relative to the rails, provide intuitive information about the UAMVs 5 altitude with respect to what is intended/desired. The displayed image 310 shows how the controller 12 visually communicates that the UAMV 5 is above (i.e., at a higher altitude than) the active leg 202 of the intended flight path. In image 310, the overlay of the bullseye 216 on the flight path vector symbol 212 and the left rail 306 and right rail 304 straddling the active leg 202 indicates that the UAMV 5 is on the correct track and flight path angle. However, unlike in displayed image 302, in which active leg 202 extends from left rail 306 to right rail 304, there is a significant and noticeable space or gap between a left-most side of the active leg 202 and the left rail 306, and there is a significant and noticeable space or gap between a right-most side of the active leg 202 and the right rail 304, which intuitively communicates that the UAMV 5 is above (i.e., at a higher altitude than) the active leg 202 of the intended flight path. Said differently, the rendering of the active leg 202 does not extend fully from the left rail 306 to the right rail 304 when the UAMV 5 is at a higher altitude than it should be for the intended or active leg 202. In various embodiments, the controller 12 visually distinguishes the active leg 202 from a background color of the image. In various embodiments, the controller 12 visually distinguishes the active leg 202 from the right rail 304 and the left rail 306. In various embodiments, the controller 12 does so by rendering the active leg 202 in a color or shading technique that contrasts with the background or the image, and is different from that of the rails, so that these gaps or spaces are very easily visually noticeable and therefore intuitive. In various embodiments, the shading technique employed is utilized to make objects that are farther away appear smaller using variations in textures/sizes.

The displayed image 312 shows how the controller 12 visually communicates that the UAMV 5 is below (at a lower altitude than) the active leg 202. In image 312, the overlay of the bullseye 216 on the flight path vector symbol 212 and the left rail 306 and right rail 304 straddling the active leg 202 indicates that the UAMV 5 is on the correct track. However, unlike in displayed image 302, in which active leg 202 extends from left rail 306 to right rail 304, a left-most side of the active leg 202 extends a significant and noticeable amount left of the left rail 306, and a right-most side of the active leg 202 extends a significant and noticeable amount right of the right rail 304, which intuitively communicates that the UAMV 5 is below (i.e., at a lower altitude than) the active leg 202 of the intended flight path 205.

Figure 4:
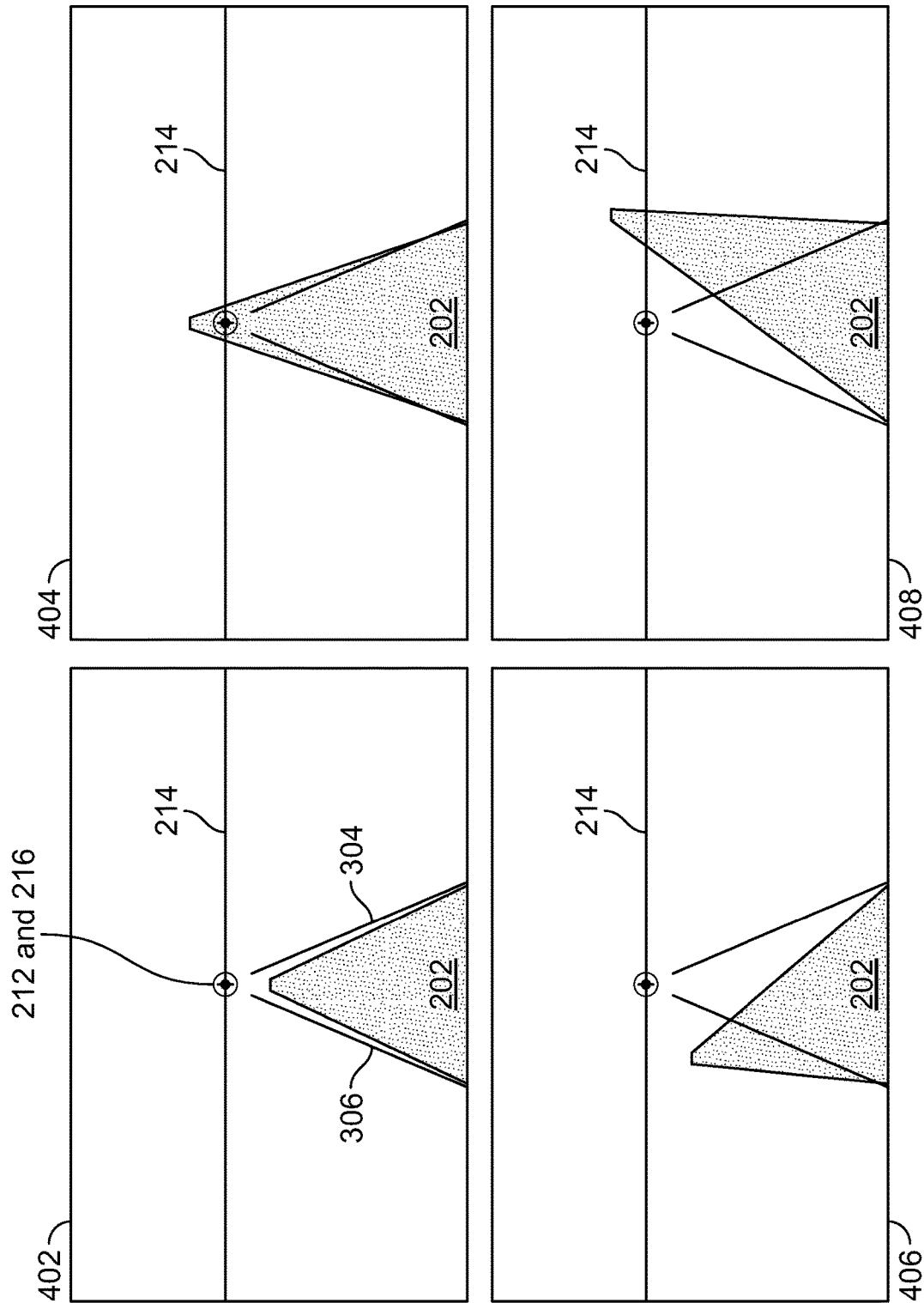

In FIG. 4, the displayed image 402 shows how the controller 12 can indicate that the UAMV 5 is on the/desired track and active leg 202, but that the active leg 202 is sloping down and forward from the current UAMV 5 altitude. Specifically, the desired flight path angle is negative and the current flight path angle is zero. Displayed image 404 shows how the controller 12 can indicate that the UAMV 5 is on the desired track and active leg 202, but that the active leg 202 has a desired flight path angle is positive and the current UAMV 5 has a current flight path angle of zero. Displayed image 406 shows how the controller 12 can indicate that the UAMV 5 is on course and active leg 202, but that the active leg 202 is sloping downward and leftward from the current UAMV 5 position (the desired track is to the left and the desired flight path angle is negative). Displayed image 408 shows how the controller 12 can indicate that the UAMV 5 is on the right track and active leg 202, but that the active leg 202 is sloping upward and rightward from the current UAMV 5 (the desired track is to the right and up angle).

Figure 5:
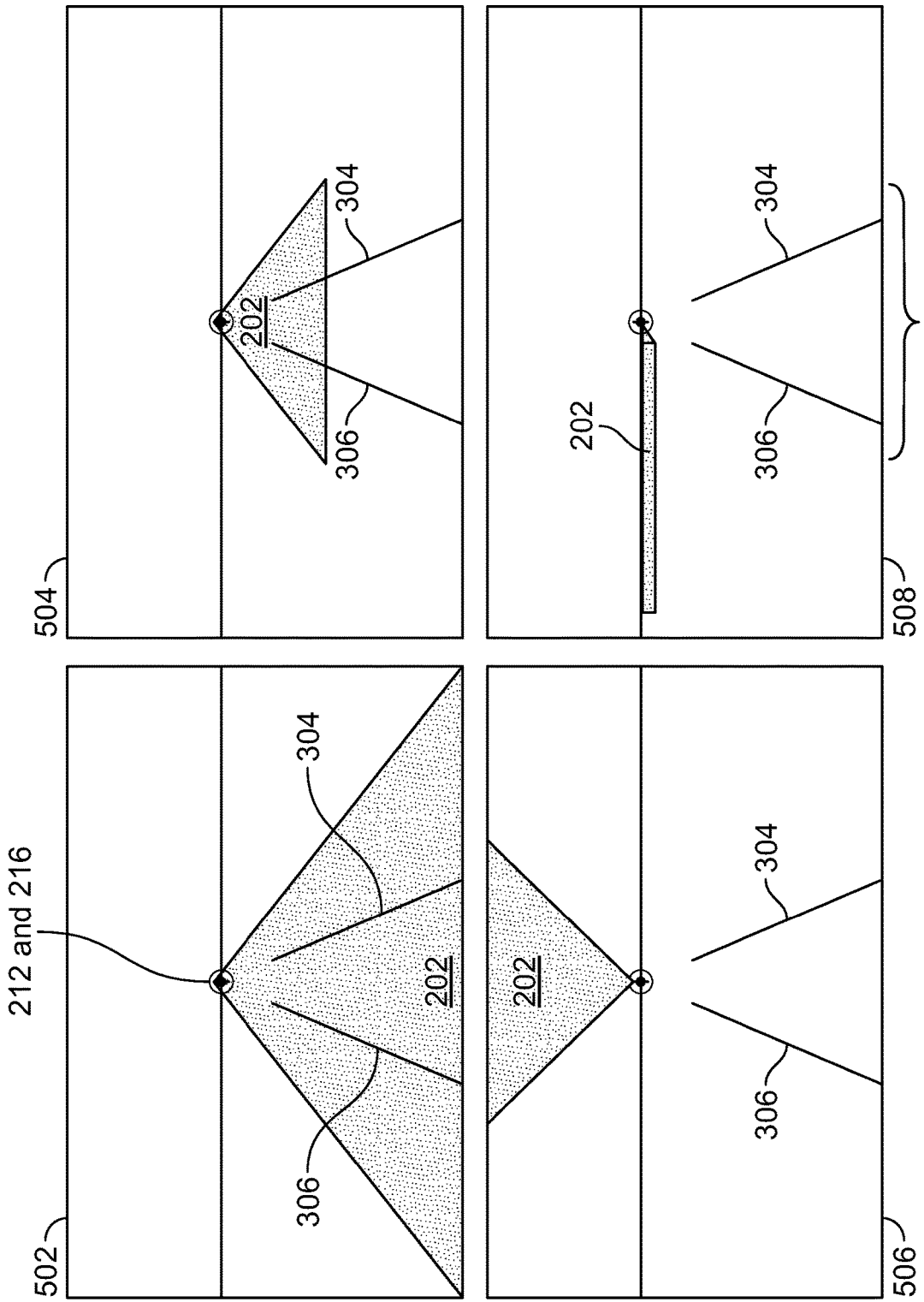

FIG. 5 provides examples of how the controller 12 can indicate to an operator the instant of the UAMV 5 deviating below (502) and through (504) the active leg 202. Displayed image 506 may indicate the UAMV 5 is directly below the active leg 202. Displayed image 508 may depict being below yet still matching desired track and desired flight path angle with the active leg 202. In FIG. 5, the shadow is understood to be on the virtual ground of the image.

Figure 6:
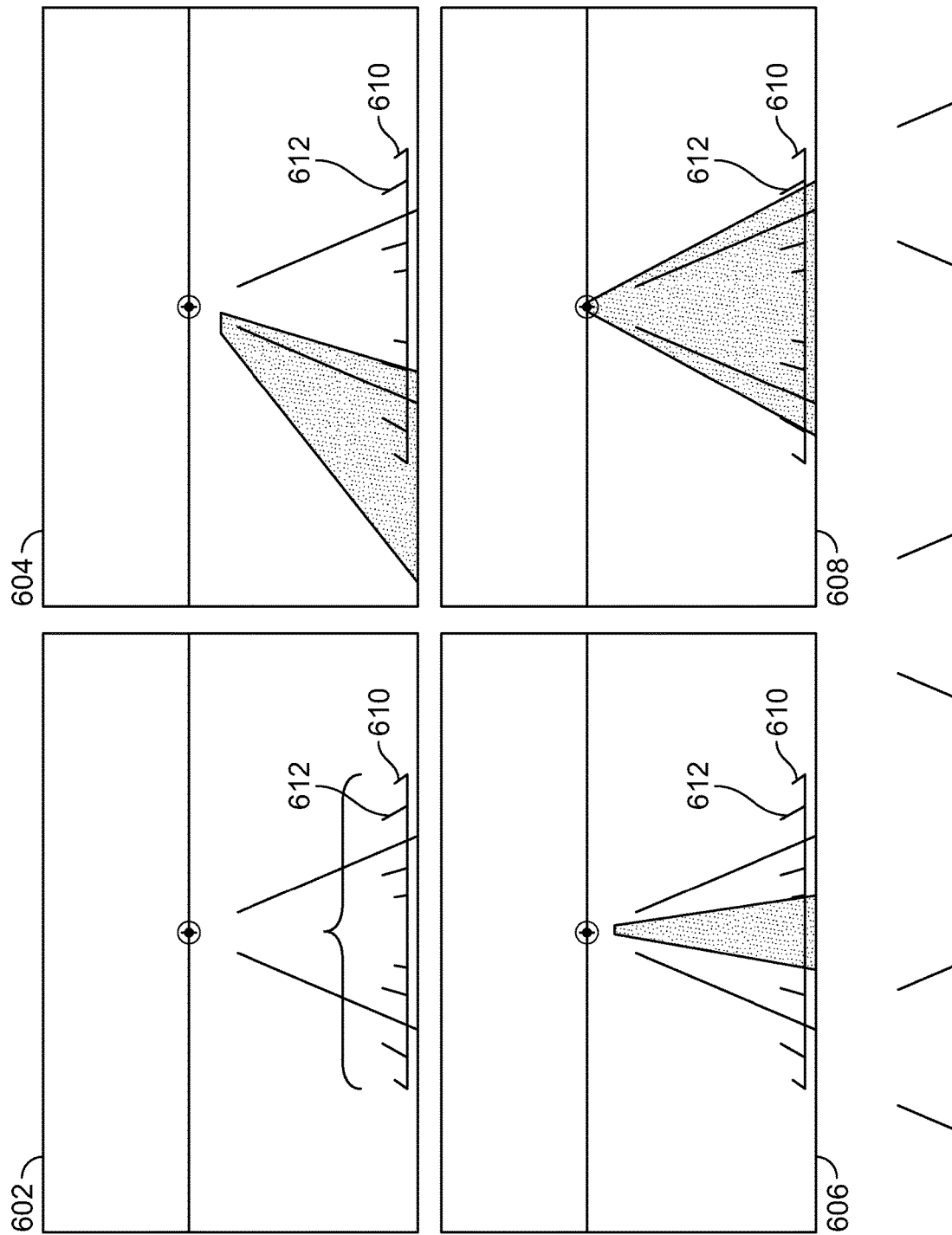
Figure 7:
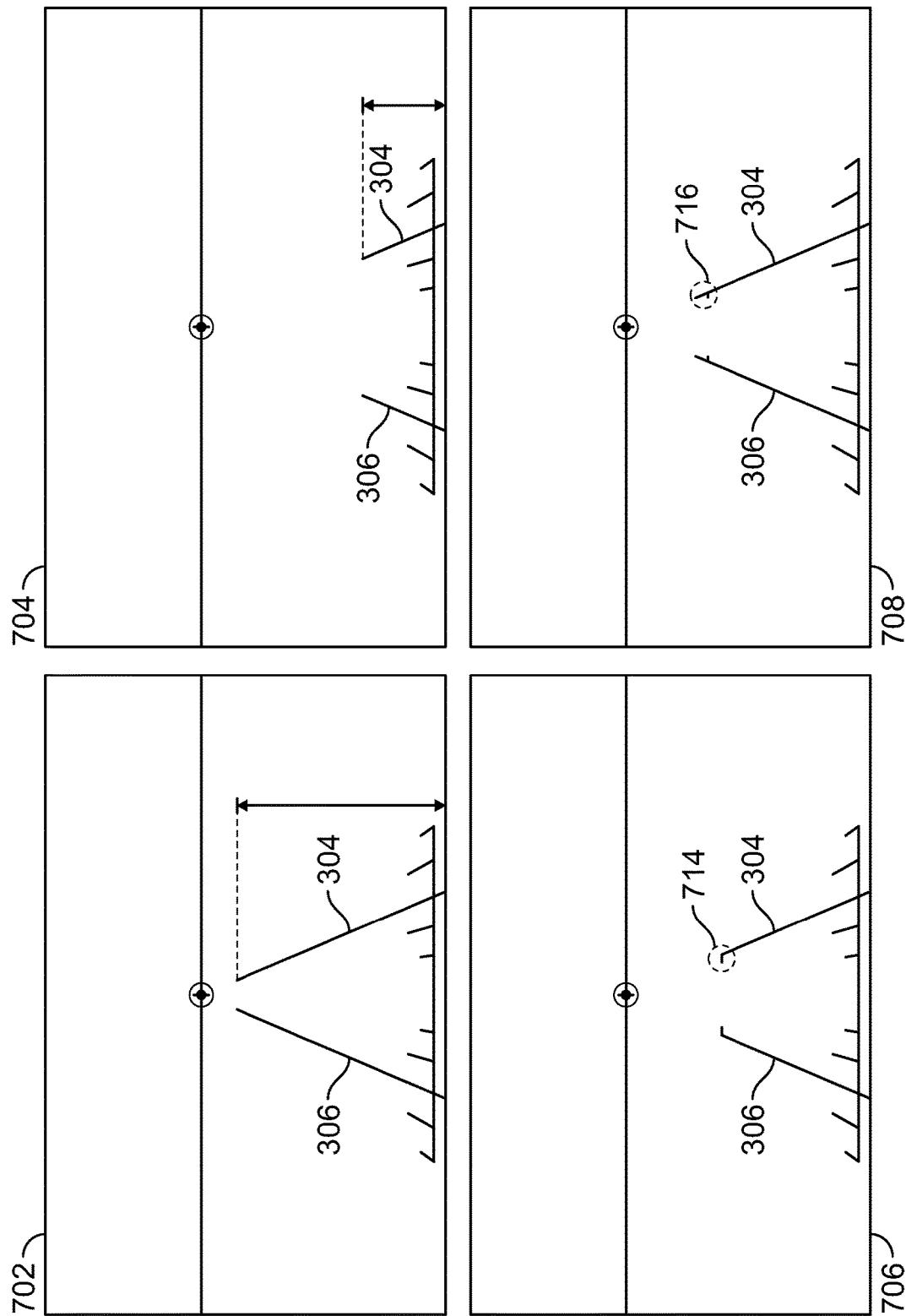

FIGS. 6-7 depict features available in certain embodiments. In a step, the controller 12 can render deviation marks 612 on a laterally displayed ruler 610 (see 602, 604, 606, and 608). An operator can use information encoded in the ruler 610, such as, predefined units of the ruler 610, to make magnitude of deviations (in distance and time) determinations during operation of the UAMV 5.

In a step, the controller 12 may render the right rail 304 and the left rail 306 to have a length that is used to encode and visually communicate information, such as, a speed of the UAMV 5, a stopping point, or a travel time (see, 702, 704, 706, and 708). Additionally, the controller 12 may embellish the right rail 304 and the left rail 306 with end-rail indicators 714 and/or other indices 716, for encoding additional operator information. Encoded information can also communicate predicted path, deviations, turn rate, fpa rate, current FPA and current track angle.

Figure 8:
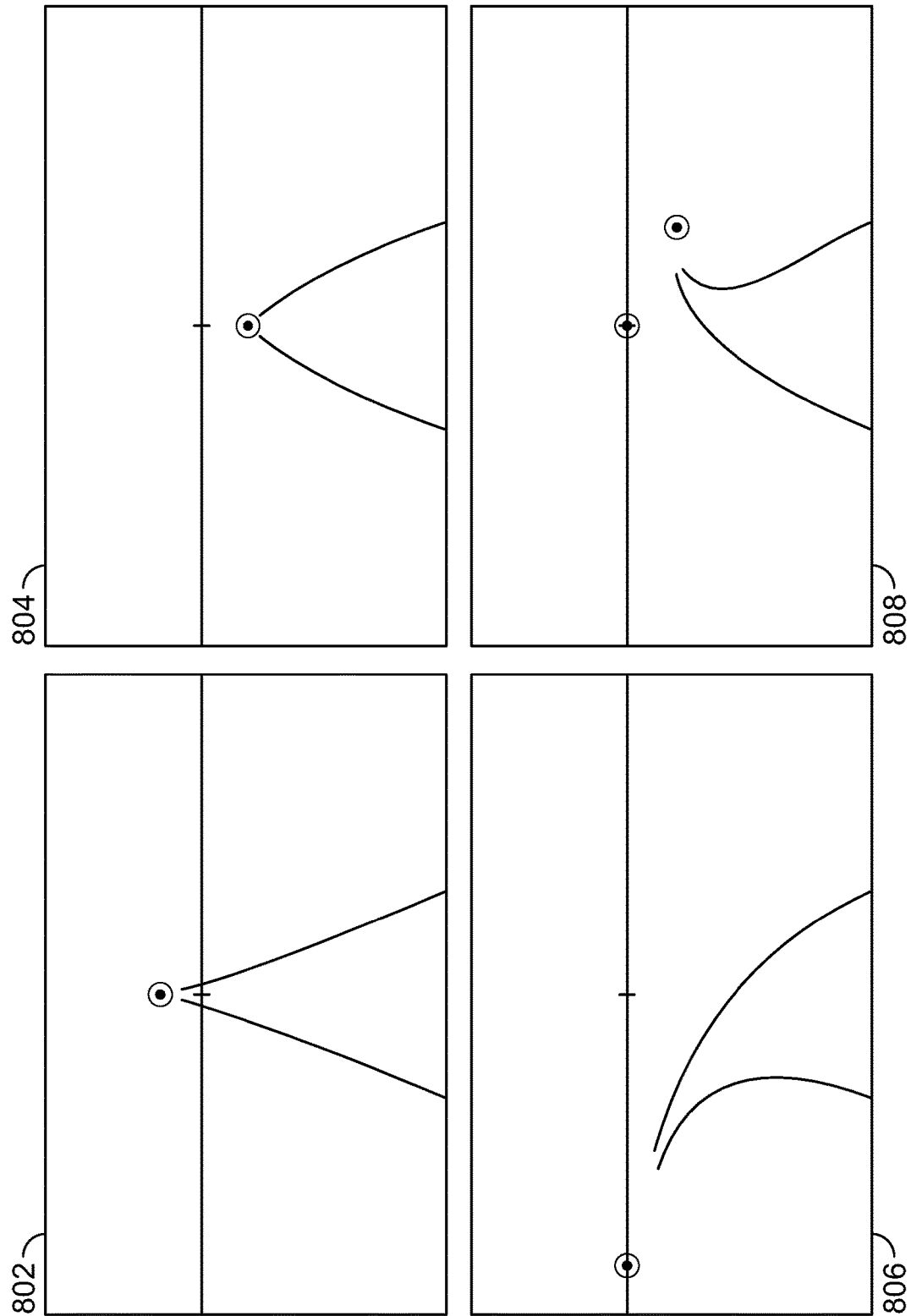

FIG. 8 provides various additional embodiments of the system 10 and method, such as, a step for indicating non-zero track rate (turn rate) and non-zero flight path angle rate traveling forward and up (802), forward and down (804), making a left turn and maintaining altitude (806), making a right turn, and descending in altitude (808).

Figure 9:
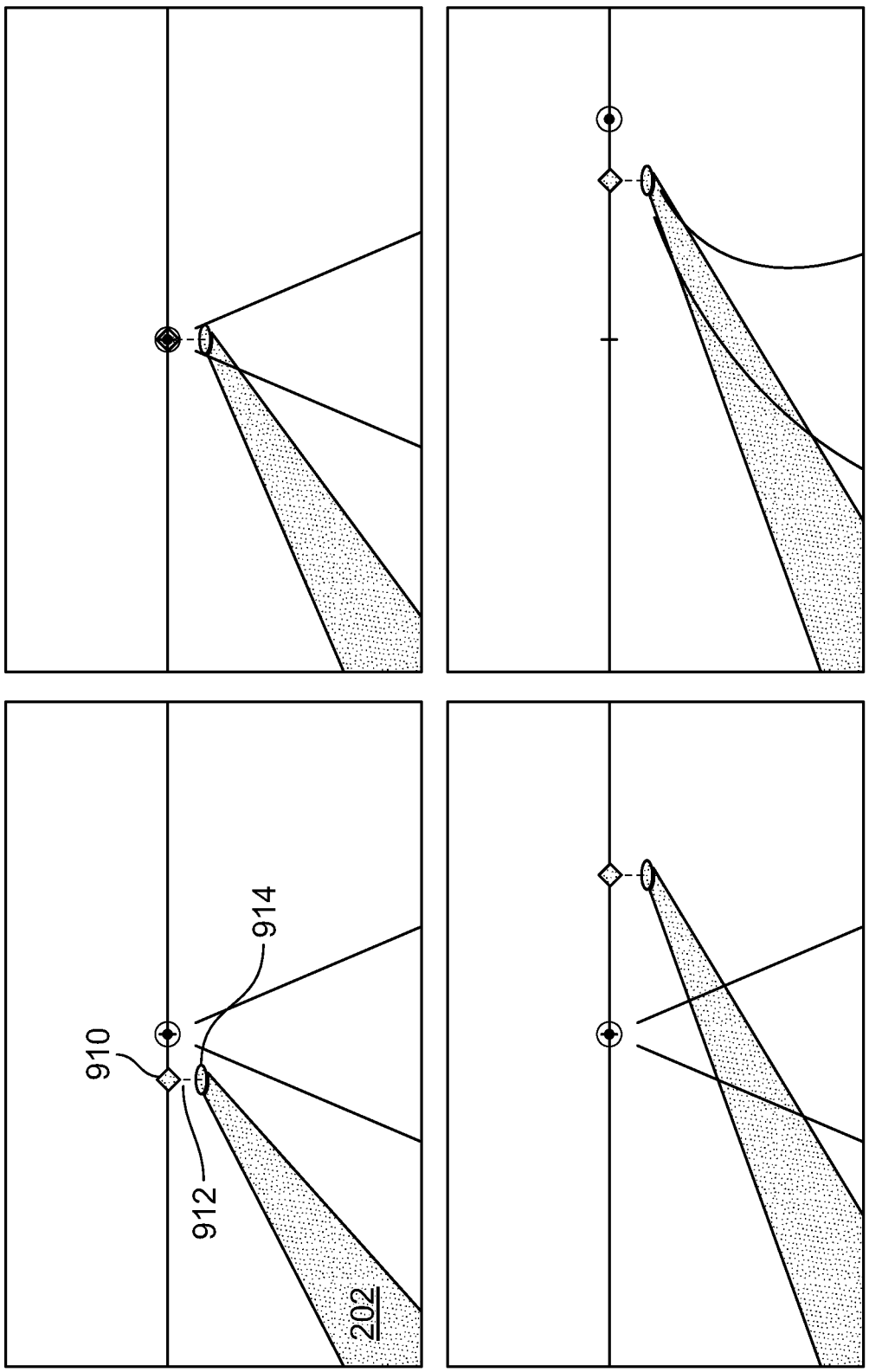
Figure 10:
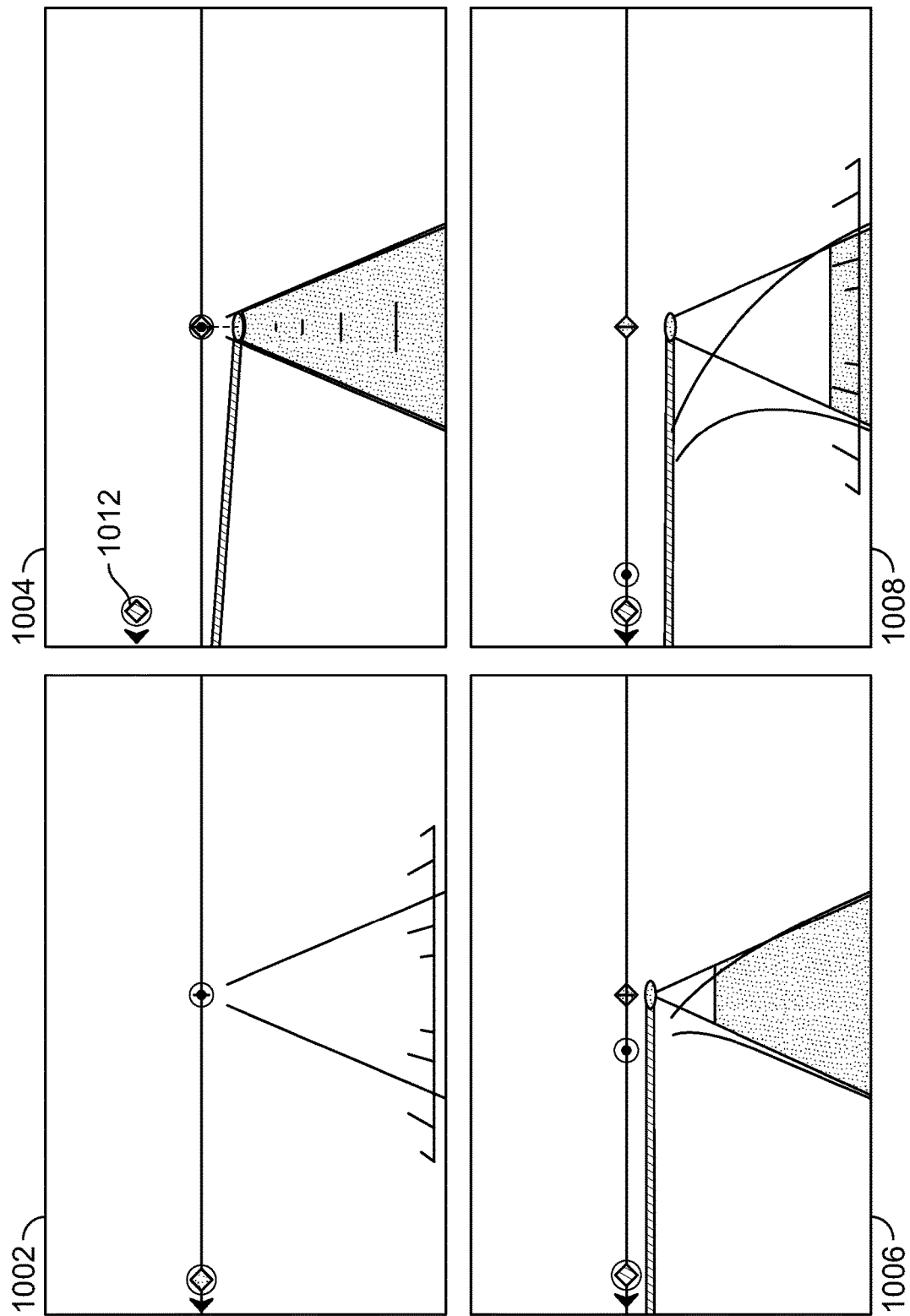
Figure 11:
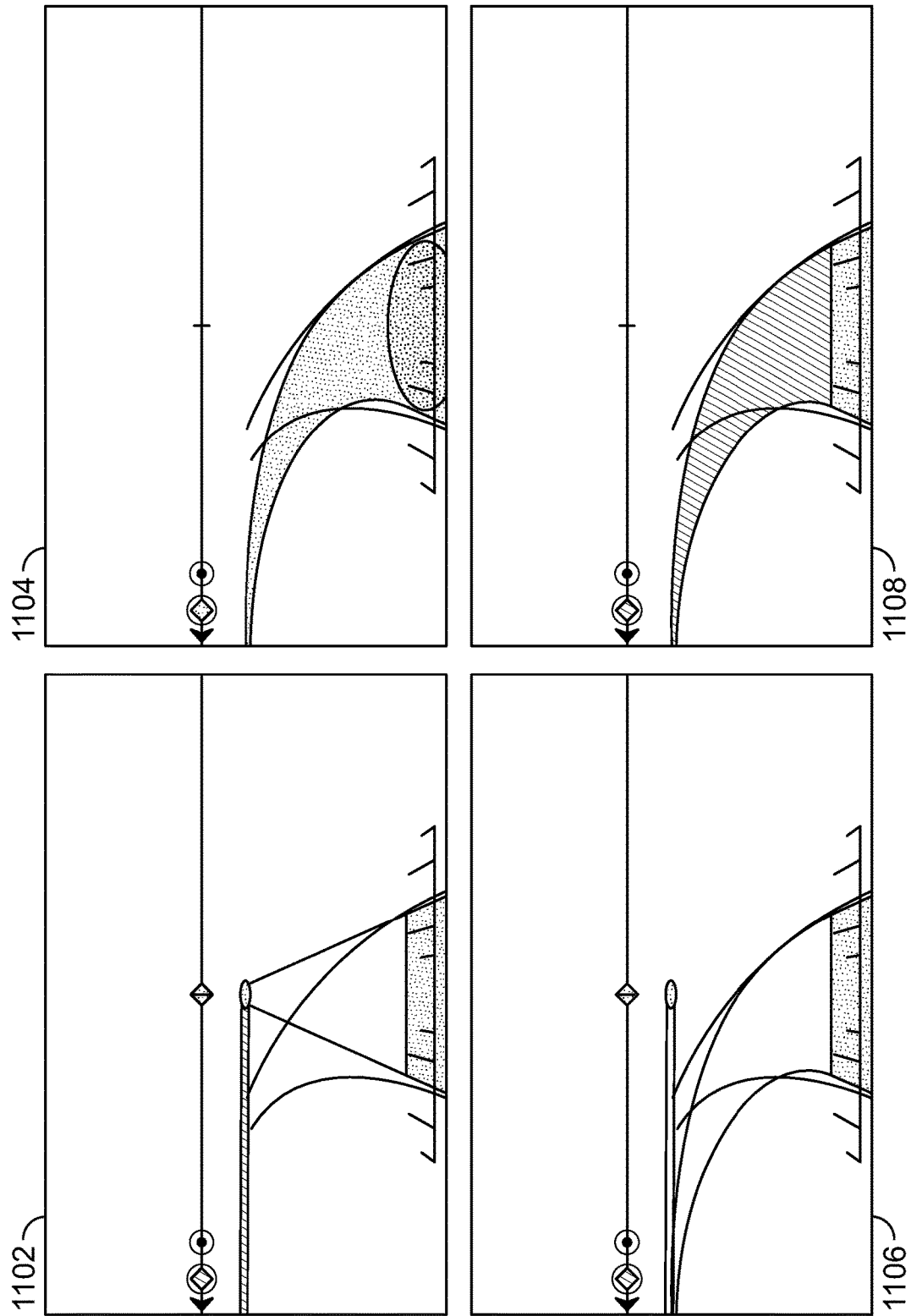

FIGS. 9-11 introduce features available in various embodiments. In FIG. 9, in a step the controller 12 may depict waypoints using an intuitive road-sign methodology, as follows. A waypoint symbol 910 is depicted on the flight path 205 and a waypoint shadow 914 is depicted directly below the waypoint symbol 910 (below meaning down/ toward the bottom on the displayed image, and lower altitude) on the flight path visualization active leg 202 and/or on the displayed rendering of the ground plane (terrain). In various embodiments, a visual element 912 is used to connect the waypoint symbol 910 to the waypoint shadow 914. This is intuitive, as it mimics road signs that people are familiar with. When the waypoint 1012 is expected to be off-screen, an off-screen indicator may be used to communicate this, such as is shown in FIG. 10. Additionally, the system 10 and method can visually communicate turns in active legs 202 (FIGS. 11, 1102-1108) and turns in UAMV 5 current operation (FIGS. 10, 1002-1008) can be indicated on the display.

In the provided images, waypoints are depicted as diamonds and placeholders have circular or elliptical shapes. In other embodiments, the shapes of the waypoints and placeholders may vary. Additionally, a variety of visualization techniques may be used, including color coding for active legs, waypoints, next legs, etc. As may be appreciated, the exemplary displays of FIGS. 2-11 have been simplified to convey key concepts.

Thus, flight display systems for displaying simplified primary flight information for an urban air mobility vehicle (UAMV) have been provided. Embodiments provide a primary flight display with an enhanced human-machine interface to support the intuitive operation of the UAMV commensurate with an expected reduced training background of the operators.

Although an exemplary embodiment of the present disclosure has been described above in the context of a fully-functioning computer system 10 described above in conjunction with FIG. 1), those skilled in the art will recognize that the mechanisms of the present disclosure are capable of being distributed as a program product (e.g., an Internet-disseminated program or software application) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A system for displaying primary flight information for an urban air mobility vehicle (UAMV), comprising:
   a source of geospatial data for the UAMV;
   a display system configured to process the geospatial data and map data for displaying on a display device onboard the UAMV;
   a controller operationally coupled to the source of geospatial data and the display system, the controller programmed to:
      display a virtual camera view including an active leg and a zero pitch reference line with the center of the camera view aligned to a flight path vector of the UAMV, the active leg being one of between a previous waypoint and a next waypoint and between a current location of the UAMV and the next waypoint;
      render a flight path vector indicator in relation to the zero pitch reference line, the flight path vector indicator being a projection of a current track and flight path angle of the UAMV on the zero pitch reference line and encircle the flight path vector indicator with a symbolic icon;
      depict the active leg with an active leg vanishing point at a desired track angle and a desired flight path angle of the active leg;
      render the active leg using a first visualization technique and render a next leg in a second visualization technique; and
      depict a current lateral and vertical orientation and a current track and a current flight path angle of the UAMV on the active leg by rendering a right rail and a left rail on the virtual camera view such that vanishing points of the right rail and the left rail align with the flight path vector.

2. The system of claim 1, wherein the controller is further programmed to modify an appearance of the active leg to convey depth.

3. The system of claim 2, wherein the controller is further programmed to modify the active leg to be depicted in a perspective view, with objects closer to the current location of the UAMV appearing larger than objects farther from the current location of the UAMV.

4. The system of claim 1, wherein the first visualization technique is a first color, and the second visualization technique is a second color.

5. The system of claim 1, wherein the active leg and the next leg are part of a flight path, and wherein the controller is further configured to depict a waypoint on the flight path and depict a waypoint shadow below the waypoint.

6. The system of claim 5, wherein the controller is further configured to render a visual element to vertically connect the waypoint and the waypoint shadow.

7. The system of claim 1, wherein the controller is further programmed to render the right rail and the left rail to have a length that is used to encode and visually communicate a speed of the UAMV.

8. The system of claim 1, wherein the controller is further programmed to embellish the right rail and the left rail with end-rail indicators to encode information.

9. The system of claim 1, wherein the controller is further programmed to visually distinguish the active leg from a background color of the virtual camera view.

10. A method for displaying primary flight information for an urban air mobility vehicle (UAMV), comprising:
    a controller operationally coupled to a source of geospatial data and a display system,
    displaying a virtual camera view including an active leg and a zero pitch reference line with the center of the camera view aligned to a flight path vector of the UAMV, the active leg being one of between a previous waypoint and a next waypoint and between a current location of the UAMV and the next waypoint;
    rendering a flight path vector symbol on the zero pitch reference line, the flight path vector symbol being a projection of a current track and flight path angle of the UAMV on the zero pitch reference line and encircling the flight path vector symbol with a symbolic icon;
    depicting the active leg with an active leg vanishing point at a desired track angle and a desired flight path angle of the active leg;

rendering the active leg using a first visualization technique and rendering a next leg in a second visualization technique; and depicting a current lateral and vertical orientation and a current track and a current flight path angle of the UAMV on the active flight leg by rendering a right rail and a left rail on the virtual camera view such that vanishing points of the right rail and the left rail align with the flight path vector.

11. The method of claim 10, further comprising modifying an appearance of the active leg to convey depth.

12. The method of claim 11, further comprising modifying the active leg to be wider at a bottom of the virtual camera view, indicating a closeness to the current location of the UAMV, and thinner as it approaches a middle of the virtual camera view.

13. The method of claim 10, wherein the first visualization technique is a first color, and the second visualization technique is a second color.

14. The method of claim 10, wherein the active leg and the next leg are part of a flight path, and further comprising depicting a waypoint on the flight path and depicting a waypoint shadow below the waypoint.

15. The method of claim 14, further comprising rendering a visual element to vertically connect the waypoint and the waypoint shadow.

16. The method of claim 10, further comprising rendering the right rail and the left rail to have a length that is used to encode and visually communicate a speed of the UAMV.

17. The method of claim 10, further comprising embellishing the right rail and the left rail with end-rail indicators to encode information.

18. The method of claim 10, further comprising visually distinguishing the active leg from a background color of the virtual camera view.

19. The system of claim 1, wherein the flight path vector indicator comprises a combination of a ground track indicator and a flight path angle indicator.

20. The system of claim 1, wherein the symbolic icon is a bullseye.

* * * * *